United States Patent Office 2,889,291
Patented June 2, 1959

2,889,291

PREPARATION OF CELLULAR POLYURETHANE RESINS

Howard R. Moore, Hatboro, Pa.

No Drawing. Application February 2, 1955
Serial No. 485,836

4 Claims. (Cl. 260—2.5)

(Granted under Title 35, U.S. Code (1952), sec. 266)

The invention described herein may be manufactured and used by or for the Government of the United States of America for governmental purposes without the payment of any royalties thereon or therefor.

This invention relates to improved cellular plastic products and the process for producing them, more particularly, it relates to an improved process for upgrading the physical properties of currently available foaming resins and for manifesting the inherently superior cross linking capabilities of new resin formulations.

There are a large number of uses in the electrical, ship, aircraft, building, and other industries for low density, high strength dielectric materials. The cellular foamed-in-place plastics produced by alkyd resin-polyisocyanate condensation polymerizations are the best available materials for these applications. However, for a number of uses, existing resin polyisocyanate condensation processes are deficient both as regards processing criteria and product properties comprising mechanical strength at normal and elevated temperatures, water absorption, dielectric constant, loss tangent, and others. In respect to processing criteria, the short time interval between pouring and the incidence of expansion with these materials and processes imposes a serious limitation in the accurate placement of tooling in matched die molding. Efforts to prolong the interval by outside cooling of the reaction mixture are not satisfactory because of the excessive temperatures and wide temperature fluctuations encountered, leading to inferior physical properties and non-uniform density and texture of the resulting products. Furthermore, the uncontrolled release of exotherm for a considerable period of time after the foam has gelled tends to cause cracking and carbonization of thick sections of the product due to its characteristically low thermal conductivity. Because of these limitations, it is necessary to foam thick sections in stages. This increases labor costs and gives an inhomogeneous product due to the plurality of dense boundary skins formed in successive foamings.

No process has been available prior to this invention for making 100 pounds, or more, of alkyd polyisocyanate condensate in one operation. As contrasted to previous processes, the user here has the option of making his own condensate to be poured immediately into the cavity to be foamed at the proper viscosity and temperature, or he may procure completely processed condensate as a packaged material from a vendor.

Typical uses of the foams of the present invention wherein small variations in physical properties, such as density, density gradient, heat resistance, water absorption, adhesion to the boundary skins in sandwich structures, and electrical properties are highly critical, are aircraft and missile radomes, and structures of varying contour required to shield radar antennas. These uses require that the foamed cores be capable of high microwave energy transmission with minimum deflection of the radar beam. Foam density, density gradient, and texture must be uniform from radome to radome, within narrow limits, to qualify for this exacting use. The dielectric constant and loss tangent should be as low as possible in order for effective broad banding transmission.

The use of foams in aircraft radomes is merely illustrative of the many applications of foamed products wherein slight changes in physical properties due to inadequate materials and processing techniques are highly critical.

It is, therefore, an object of this invention to provide a cellular foamed product of reproducible texture and density and with superior electrical, mechanical strength, heat and water resistance properties.

It is another object of this invention to provide a method for making plastic foamed products by which articles of large cross section may be made by polymerizing the resin in place to form a rigid bond between the foamed product and the walls of the container.

It is still another object of this invention to provide a method for producing foamed plastics which can be polymerized in place to bond to practically any backing materials, such as, glass reinforced polyester resin laminates and metals without pre-coating or preconditioning the boundary surfaces to secure adequate adhesion.

It is a specific object of this invention to provide a process as stated above, which is simple, inexpensive in application, commercially feasible, and adaptable to utilization of improved foaming resins.

It has been found that the above and other objects are accomplished by introducing pulverized solid carbon dioxide snow into the foaming reaction mixture at reduced temperatures in sufficient quantity to neutralize the exothermic heat of reaction as fast as it is liberated during the progress of the alkyd-polyisocyanate condensation. In contrast to prior processes, the effect is to produce viscosity plateaus, or stabilized viscosity levels of different magnitude depending on the reaction temperature. This condition insures mobility of the condensate for a sufficient time to permit the progress of reactions favorable to the production of an improved foamed product.

The explanation of this effectiveness of the invention is best understood by reference to the mechanism of the foaming reactions involved.

The formation of alkyd polyisocyanate foams is based on the principle of polyurethane and polyurea thickening to trap carbon dioxide gas evolved in the subsequent formation of polyamide linkages. Typical foaming resins comprise the partial reaction product of an excess of triol, such as gylcerine or trimethylolpropane, with a dibasic acid, such as adipic or phthalic acids, resulting in the formation of acidic, heavily hydroxylated polyesters with unesterified terminal hydroxyl and carboxyl groups, as illustrated by the reaction

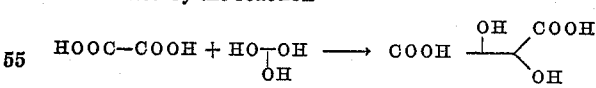

If the body of the polyester molecule is designated by the symbol, R, the polyester may have various end group arrangements, such as (I) 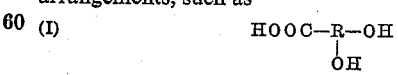

(II) 

and (III) 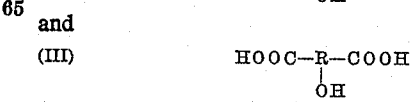

Group I, which may be considered typical because of the unvarying excess of hydroxyl over carboxyl groups, is capable of reacting with an aromatic diisoxyanate, such as toluene diisocyanate, as indicated by Reactions a, b, and c which may occur simultaneously:

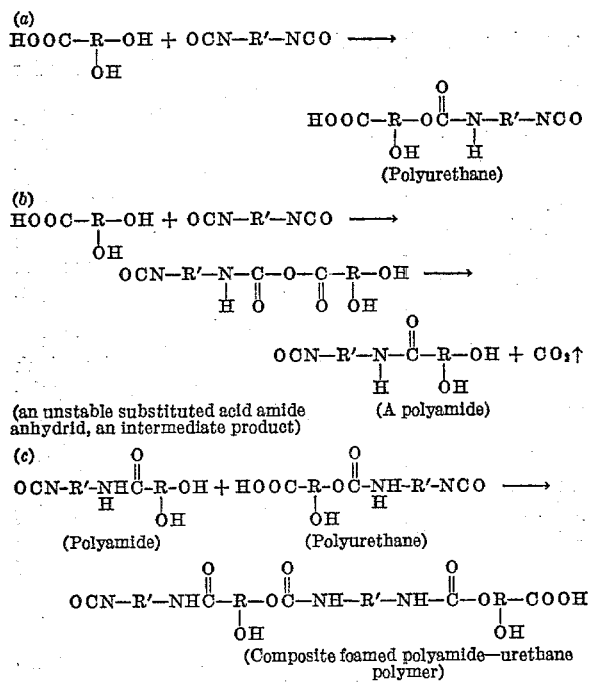

From the above, it is evident that as the composite polyamidepolyurethane polymer builds up there will always be a residuum of unreacted terminal NCO groups on incompletely reacted alkyd molecules, as well as a number of unreacted OH and COOH groups imprisoned in the expanded foam. The complexity of the situation is further aggravated by the presence, in commercial foaming resins, of 1 to 4% residual water of esterification which reacts with diisocyanates more avidly than hydroxyl groups of the resin to form carbon dioxide gas and substituted amines. These amines, in turn, react immediately with diisocyanates to produce linear substituted ureas with terminal isocyanate groups, as illustrated by the Reactions d and e.

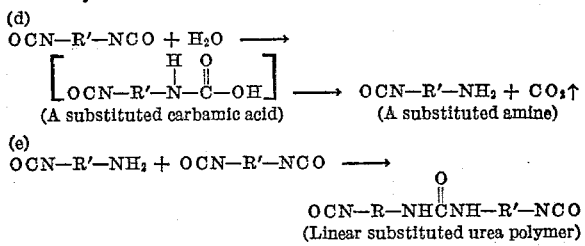

The linear substituted urea polymers formed by these reactions will reduce the physical strength characteristics of the composite polyurethane-amide foams because of their flexibility unless some means is discovered for cross linking their terminal isocyanate groups with unreacted hydroxyl and carboxyl groups while the condensate is still in the fluid state.

It follows from the above reactions that the optimum foaming process is one producing a product having the maximum number of urethane and amide groups per unit weight of foam and the minimum number of unreacted isocyanate, hydroxyl, and carboxyl groups remaining in the foamed structure after curing. The quantity of unreacted hydroxyl and carboxyl groups remaining in the cured foam controls moisture absorption and the degree of departure from the maximum physical strength, electrical, and other physical properties the foamed product would possess had the cross linking been more complete.

The above reactions further serve to illustrate the importance of maintaining alkyd diisocyanate condensates in a fluid state for an appreciable time to build up as many gas evolving amide and urea linkages as possible before gelation occurs. This is tantamont to inhibiting the formation of non-expanding primary urethane linkages whose rapid formation in the mixing process seriously competes with decarboxylation of substituted acid amide anhydrides and substituted carbamic acids during the expansion process.

As pointed out by Hebermehl (Paint, Oil and Chemical Review, March 3, 1949), the present status of the art of reacting isocyanates with functional groups in alkyd resins is such that only a small percentage of the groups react before the mobility of the condensate is reduced to such a degree that the groups fail to approach each other within the critical distance required for the exertion of Van der Walls, or secondary valence forces. This accentuates the significance of my invention in providing conditions for the creation of labile, or secondary valence, pre-polymer urethane bonds, whose formation is characterized by relatively stable viscosity plateaus after the attainment of compatibility. Furthermore, the partial neutralization of hydroxyl group reactivity by my new internal cooling process conserves the total potential exothermic heat reserve of the system, so that later relaxation of temperature control effects the required reduction in pour point viscosity and liberation of heat during expansion to promote appreciably more complete decarboxylation reactions and higher ultimate yield of urethane bonds by conversion of secondary pre-polymer bonds to primary linkages in the final stage of cure after gelation.

My invention of an improved process for increasing the degree of cross linking of organic diisocyanates with alkyd resins is based on the condensation of a commercially available organic diisocyanate, metatoluene diisocyanate, hereinafter referred to as "TDI," with the so-called "standard" foaming resin, Selectron 5922, produced by the Pittsburgh Plate Glass Company, and other resins capable of foaming with existing foaming agents. These materials may be condensed by methods of no temperature control and "normal" methods of moderate temperature control by outside cooling of the reaction vessel in which they are mixed to provide foams meeting the requirements of MIL-C-8087 (USAF) specification of March 19, 1954, for foamed-in-place core material, alkyd-isocyanate type. My invention of an improved processing method, however, is capable of providing still better foams with existing resins and those described in my patent application Serial No. 727,499 and may be carried out satisfactorily with other diisocyanates of greater reactivity than "TDI," such as Desmodur C (1-chlorophenyl-2,4, diisocyanate) and Desmodur 15 (1,5-naphthyl diisocyanate); and diisocyanates of lesser reactivity, such as Desmodur T (a 60/40 blend of "TDI" with 2,6 toluene diisocyanate), Desmodur H (1,6-hexamethylene diisocyanate). Triisocyanates also may be used, such as Desmodur R (triphenylmethane triisocyanate) and Desmodur DR (diphenyl-4,6,4'-triisocyanate). These polyisocyanates are described in "German Plastics Practice," by De Bell et al., 1946, pages 300 to 304 and 524.

Selectron 5922 "Standard" foaming resin chosen for the initial evaluation of my improved condensation process is based on the partial esterification of 3.8 moles of glycerine with 2.5 moles of adipic acid and 0.5 mole of phthalic anhydride, corresponding to an OH (hydroxyl)/COOH (carboxyl) "starting" mole ratio of 1.9:1. This resin is thus a close counterpart of Desmophen 800S based on 4.0 moles of triol (glycerine or trimethylol-propane) with the same molar proportions of adipic acid and phthalic anhydride (OH/COOH mole starting ratio of 2:1). The Desmophen foaming resins are described in "German Plastics Practice," by De Bell et al., 1946, pages 310, 311 and 464.

The original Desmophen foaming resins and the above American modification both have an ingredient functionality pattern of 3:2, wherein the polyfunctional alcohol constituent is named first in defining the functionality of reacting constituent ingredients, and the polyfunctional acid constituent, second. Triols (glycerine of trimethylolpropane) used in making the Desmophens and Selectron 5922 have a functionality of 3 and the dibasic acid combination (adipic acid and phthalic anhydride) a functionality of 2. As explained by Dr. A. Bayer in his account of the synthesis of Desmophens, Angewandte Chemie, 59, 259–272 (1947), these incompletely esterified products were made in an attempt to upgrade the physical strength properties of non-expanding polyurethanes similar to Igamid U, obtained by reacting equivalent quantities of hexamethylene diisocyanate (Desmodur H) with 1,4 butane-diol. The high polymer complexity of the Desmosphens did, in fact, produce better polyurethanes when the esterification reaction was carried out to give anhydrous resins of acid number less than 2; however, when the polycondensation was interrupted at acid numbers in the 30–40 range, the addition of sufficient organic diisocyanate to combine with the unreacted functional groups unexpectedly gave foams of varying strength depending on the Desmophen resin formulations.

Arithmetical "TDI"/resin ratios are calculated on the assumption that two moles of "TDI" are required for complete cross linking of the reactive constituents in the resins, one half mole each for the hydroxyl and carboxyl groups and one mole for the water in proportion to the amount present. The lot of Selectron 5922 used in evaluating the relative merits of different ways of carrying out my improved Dry Ice internal cooling process had a reactivity ratio of 0.87, in accordance with the foregoing assumption that both NCO groups react completely. This result is obtained from the following equation for calculating the quantity of "TDI" required for 100 grams of resin:

Wt. "TDI," grams $$= \frac{\text{Wt. anhydrous resin} \times \text{sum OH and COOH Nos.} \times \text{mol. wt. "TDI"}}{\text{Milli-equivs. KOH per formula wt.} \times 2}$$

$$+ \frac{\text{Percentage water in resin} \times \text{mol. wt. "TDI"}}{\text{Mol. wt. water} \times 2}$$

Substituting analytical data of 475 and 45 for the hydroxyl and carboxyl numbers, and 1.5% for the water content, the amount of "TDI" for 100 grams of resin is $$\frac{98.5 \times (475+45=520) \times 174}{56100 \times 2} + \frac{1.5 \times 174}{2 \times 18} = 87 \text{ grams}$$

Similar data for different lots of Selectron 5922 show that the reactivity ratios for this foaming resin vary between the limits 0.85–0.95, but as stated above, my internal cooling process was evaluated in comparison with existing methods using a shipment of material having a 0.87 ratio. In any case, the above method of calculation based on the assumption of stoichiometrically complete reactions undoubtedly gives "TDI"/alkyd reactivity ratios that are too high, in consideration of the highly debatable assumption that both NCO groups in "TDI" react with equal efficiency in the cross linking process. In organic synthesis, for example, it has been established that the NCO group para to the methyl group in 2,4-"TDI," having the structural formula

is 8 to 10 times as reactive as the ortho group (Bayer, loc. cit., 1947, and E. I. Du Pont de Nemours, Inc. brochure on "Du Pont Diisocyanates," pp. 1–10 (1953)). Hence, it is unlikely that all the ortho NCO groups of "TDI" react completely in the usual techniques of foaming resins not specifically designed for this purpose.

Neutralization of hydroxyl group reactivity by the device of forming low viscosity-increasing labile linkages with the paraisocyanate group of "TDI" is evidently necessary to secure a fair measure of reactivity of the remaining ortho groups on the release of exotherm. In my improved process herein disclosed, this neutralization is achieved by controlling the rate of reaction of the condensation by direct addition of pulverized solid carbon dioxide. It should be emphasized, at the outset, that completion of cross linking reactions is not the only factor that should be considered in formulating improved resins. Other factors relating to the intrinsic, or constitutional properties of the resin itself must be considered. However, only the mechanism for achieving a more complete cross linkage between members of the isocyanate group and the alkyd resin is set forth in this application.

Illustrative of the constituents used in preparing the alkyd resins of the instant invention is indicated in the tabulation making up Tables 1 and 2. Eighteen different resins were prepared and reacted in each instance with methatoluene diisocyanate, using the pulverized solid Dry Ice technique of the instant invention. The "TDI"/alkyd resin ratio used to prepare these foams was varied over a range of 0.59 to 0.92 gram of "TDI" per gram of alkyd resin.

TABLE 1

CONSTITUENTS EMPLOYED IN THE PREPARATION OF PARTIALLY ESTERIFIED ALKYD RESINS AND PROPERTIES OF THE RESULTANT RESINS

| | Example numbers | | | | | | | |
|---|---|---|---|---|---|---|---|---|
| | 1 | 2 | 3 | 4 | 5 | 6 | 7 | 8 |
| (a) Alcohols, moles: | | | | | | | | |
| Glycerine | 3.8 | | 7.6 | 8.0 | 7.6 | | | 7.0 |
| Hexanetriol | | 3.8 | | | | | | |
| Trimethylolpropane | | | | | | 8.0 | 8.0 | |
| 1,4 butane diol | | | | | | | | 4.0 |
| (b) Acids, moles: | | | | | | | | |
| Adipic | 2.25 | 2.25 | 5.0 | | 4.0 | 5.0 | 5.0 | |
| Phthalic anhydride | 0.75 | 0.75 | | 3.0 | 1.0 | 1.0 | 1.0 | 1.0 |
| Tetrachlorophthalic anhydride | | | 1.13 | | | | | |
| Sebacic | | | | 3.0 | | | | |
| Maleic anhydride | | | | | 1.0 | | | |
| Diglycolic | | | | | | | | 6.0 |
| Caprylic | | | | | | 2.0 | | |
| Lauric | | | | | | | 2.0 | |
| Trifluoroacetic | | | | | | | | 2.0 |
| (c) Properties: | | | | | | | | |
| OH/COOH molar starting ratio | 1.9:1 | 1.9:1 | 1.9:1 | 2:1 | 1.9:1 | 1.7:1 | 1.7:1 | 2.6:1 |
| Hydroxyl number | 438 | 345 | 337 | 421 | 426 | 291 | 228 | 439 |
| Acid number | 66 | 65 | 61 | 46 | 59 | 51 | 36 | 110 |
| OH/COOH ratio, finished resin | 6.6:1 | 5.3:1 | 5.5:1 | 9.2:1 | 7.2:1 | 5.7:1 | 6.3:1 | 4.0:1 |
| Water content, percent | 1.7 | 0.8 | 1.2 | 0.8 | 2.4 | 0.9 | 0.6 | 1.9 |
| Viscosity, poises at 77° F | 1,640 | 380 | 1,500 | 4,300 | 2,570 | 255 | 288 | 5,850 |

TABLE 2

CONSTITUENTS EMPLOYED IN THE PREPARATION OF PARTIALLY ESTERIFIED ALKYD RESINS AND PROPERTIES OF THE RESULTANT RESINS

| | Example numbers | | | | | | | | | |
|---|---|---|---|---|---|---|---|---|---|---|
| | 9 | 10 | 11 | 12 | 13 | 14 | 15 | 16 | 17 | 18 |
| (a) Alcohols, moles: | | | | | | | | | | |
| Glycerol | 2.6 | 6.0 | 6.0 | 7.0 | 6.3 | | | | 6.3 | 2.0 |
| Trimethylolpropane | | | | | | 6.9 | 5.6 | 5.6 | | |
| Monoethanolamine | | | | | | | | | | 3.0 |
| 1,4 butane diol | 0.4 | 2.0 | 4.0 | 3.0 | | | | | 2.0 | |
| Diethylene glycol | | | | | 2.0 | 1.0 | 3.0 | | | |
| Ethylene glycol | | | | | | | | 3.0 | | 4.0 |
| (b) Acids, moles: | | | | | | | | | | |
| Adipic | 2.0 | 3.0 | 3.0 | | 5.0 | 5.0 | | | 2.0 | 6.0 |
| Phthalic anhydride | 0.4 | 3.0 | | 1.0 | 1.0 | 1.0 | 1.0 | 1.0 | 2.0 | |
| Tetrachlorophthalic anhydride | | | 3.0 | | | | | | | |
| Diglycolic | | | | 6.0 | | | | | | |
| Succinic anhydride | | | | | | | 5.0 | 5.0 | | |
| Fumaric | | | | | | | | | 3.0 | |
| (c) Properties: | | | | | | | | | | |
| OH/COOH molar starting ratio | 1.8:1 | 1.8:1 | 2.2:1 | 2.8:1 | 1.9:1 | 1.9:1 | 1.9:1 | 1.9:1 | 1.4:1 | 1.9:1 |
| Hydroxyl number | 437 | 366 | 366 | 505 | 451 | 379 | 417 | 420 | 472 | 488 |
| Acid number | 39 | 64 | 51 | 54 | 36 | 35 | 49 | 30 | 26 | 4.9 |
| OH/COOH ratio, finished resin | 11.2:1 | 5.7:1 | 7.2:1 | 9.4:1 | 12.5:1 | 10.8:1 | 8.5:1 | 14:1 | 18.2:1 | 98:1 |
| Water content, percent | 0.3 | 1.1 | 0.8 | 0.8 | 0.6 | 0.9 | 1.4 | 0.3 | 0.3 | 1.2 |
| Viscosity, poises at 77° F | 4,050 | 1,920 | 560 | 3,580 | 216 | 2,020 | 435 | 3,400 | 6,150 | 144 |

TABLE 3

PRODUCT PROPERTIES OF RESTRICTED 10 LB./C. FT. FOAMS MADE WITH EXAMPLES 1-18 IMPROVED RESINS BY EXAMPLES 19 OR 22 LOW TEMPERATURE CONDENSATION PROCESSES

| Example number (resin) | Texture [1] | Color [2] | Water absorption, percent | Mechanical strength Properties in pounds per square inch | | | | |
|---|---|---|---|---|---|---|---|---|
| | | | | Compression | | Shear two plate | Tensile, p.s.i. | Toughness, p.s.i. |
| | | | | 75° F. | 200° F. | | | |
| 1 | F | PY | 2.0 | 340 | 260 | 225 | 238 | 4.0 |
| 2 | M | PY | 1.9 | 355 | 275 | 240 | 252 | 4.5 |
| 3 | F | C | 1.7 | 335 | 255 | 230 | 250 | 4.5 |
| 4 | M | PY | 1.9 | 365 | 282 | 250 | 265 | 5.4 |
| 5 | M | C | 1.6 | 360 | 280 | 252 | 270 | 5.5 |
| 6 | F | C | 1.5 | 310 | 205 | 230 | 285 | 6.0 |
| 7 | F | C | 1.6 | 285 | 185 | 225 | 260 | 5.3 |
| 8 | F | PY | 1.7 | 345 | 250 | 230 | 250 | 4.6 |
| 9 | M | C | 1.2 | 355 | 252 | 265 | 290 | 7.0 |
| 10 | F | C | 1.3 | 360 | 270 | 262 | 280 | 6.8 |
| 11 | F | C | 1.1 | 350 | 262 | 278 | 360 | 15.5 |
| 12 | M | PY | 1.2 | 370 | 278 | 265 | 295 | 7.5 |
| 13 | M | PY | 1.0 | 365 | 255 | 259 | 287 | 7.0 |
| 14 | F | C | 0.9 | 370 | 295 | 275 | 322 | 12.5 |
| 15 | M | PY | 1.0 | 290 | 202 | 262 | 275 | 6.8 |
| 16 | F | C | 1.2 | 360 | 288 | 245 | 310 | 11.0 |
| 17 | F | C | 1.0 | 370 | 295 | 242 | 285 | 6.9 |
| 18 | F | C | 0.9 | 340 | 225 | 238 | 290 | 7.2 |

[1] Texture designations are: M (medium) for average cell size of 0.040 inch and no more than four blow holes larger than ¼ inch in diameter in any one projected area comprising four square inches. F (fine) for average cell size of 0.020 inch and no more than one blow hole larger than ¼ inch in diameter in any one projected area comprising four square inches.
[2] Color designations are: PY (pale yellow) and C (colorless).

TABLE 4

Part A

EXAMPLES 19-24 PROCESSING SCHEDULES OF SELECTRON 5922-"TDI" CONDENSATES MADE TO SOLVENT-FREE POUR POINT WITH CARBON DIOXIDE INTERNAL COOLANT

| Example number (process) | Compatibility end point | | | Stabilized viscosity range | | | First peak viscosity | | | Viscosity minimum | | | Pour point (solvent free) | | |
|---|---|---|---|---|---|---|---|---|---|---|---|---|---|---|---|
| | Temp. (max.), °F. | Visc., ps. | Time, mins. | Av. temp., °F. | Visc., ps. | Duration, mins. | Av. temp., °F. | Av. visc., ps. | Time, mins. | Temp., °F. | Visc., ps. | Time, mins. | Temp., °F. | Visc., ps. | Time, mins. |
| 19 | 73 | 780 | 15 | 70 | 800 av | 10 | 70 | 850 | 27 | 86 | 290 | 32 | 88 | 480 | 38 |
| 20 | 73 | 780 | 15 | 70 | 800 av | 10 | 70 | 850 | 27 | 86 | 290 | 32 | | | |
| 21 | 73 | 780 | 15 | 70 | 950 av | 15 | 70 | 2,200 | 37 | 86 | 800 | 44 | | | |
| 22 | 73 | 780 | 15 | 60 | 6,500 av | 18 | 60 | 18,000 | 44 | 84 | 850 | 54 | | | |
| 23 | 73 | 780 | 15 | 50 | 85,000 av | 28 | 50 | 250,000 | 58 | 80 | 830 | 70 | | | |
| 24 | 73 | 780 | 15 | 40 | 300,000 av | 34 | 40 | 320,000 | 68 | 75 | 850 | 83 | | | |
| X [1] | 95 | 150 | 8 | | | | | | | 130 | 30 | 13 | 137 | 90 | 15 |
| Y [1] | 85 | 350 | 11 | | | | 85 | 1,500 | 31 | | | | | | |

[1] Example No. Processes X and Y are respective prior art methods which use no temperature control and the method of constant temperature control at 83-85° F. by external cooling.

TABLE 4—Continued

Part B

CONTINUATION OF EXAMPLES 19-24 PROCESSING SCHEDULES OF SELECTRON 5922-"TDI" CONDENSATES MADE TO SOLVENT-CONTAINING POUR POINT WITH CARBON DIOXIDE INTERNAL COOLANT

| Example number (process) | Second peak viscosity | | | Percent solvent added [2] | Pour point (solvent added) | | | Induction times duration, mins. | Expansion criteria (poured into ambient temp. mold) | | |
|---|---|---|---|---|---|---|---|---|---|---|---|
| | Temp., °F. | Visc., ps. | Time, mins. | | Temp., °F. | Visc., ps. | Time, mins. | | Temp. range, °F. | Av. viscosity range, ps. | Duration, mins. |
| 19 | | | | 0 | | | | 7 | 98–160 | 600–6,500 | 6 |
| 20 | 86 | 1500 | 45 | 4 | 86 | 400 | 47 | 8 | 96–165 | 650–6,500 | 7 |
| 21 | | | | 2 | 86 | 380 | 47 | 8 | 98–172 | 650–6,500 | 8 |
| 22 | | | | 2 | 84 | 400 | 57 | 10 | 105–178 | 650–13,000 | 11 |
| 23 | | | | 2 | 80 | 410 | 74 | 13 | 100–193 | 650–35,000 | 14 |
| 24 | | | | 2 | 77 | 400 | 88 | 14 | 103–198 | 650–83,000 | 18 |
| X [1] | | | | 0 | | | | 1 | 140–150 | 600–1,100 | ½ |
| Y [1] | | | | 4 | 85 | 390 | 33 | 4 | 98–120 | 650–2,500 | 3 |

[1] Example No. Processes X and Y are respective prior art methods which use no temperature control and the method of constant temperature control at 83–85° F. by external cooling.
[2] Examples 20–24 and Example "Y" pour points are obtained with acetone, although methylene chloride, ethyl chloride, and other solvents of low boiling point also may be used.

As stated previously, this invention provides a process capable of maximum utilization of resin properties in establishing conditions for more complete cross linking reactions with polyisocyanates than hitherto obtained. The process is unique also in its capacity for controlling the speed of condensation of highly reactive resins other than Selectron 5922 that cannot be foamed by other methods because of their rapid gelation tendencies. A modification of the process is further unique in relieving prospective users of the necessity of personally conducting the carefully controlled preliminary and intermediate steps of resin "TDI" condensations. The consumer need only purchase the pre-processed condensation product in solid, frozen form, and provide the necessary heating facilities for converting the frozen material to a liquid either before or after its delivery to the cavity to be foamed. This technique permits working time intervals of 30 minutes to 3 hours from the time of delivery of the pre-processed condensate to the cavity and the incidence of expansion, thus providing ample time for the placement of intricate matched dies and assemblies. Formerly, the working time, or pot life was limited to 5 minutes. Furthermore, the manufacturer is now able to reduce selling costs and increase the use of the product because of possibility of processing large batches, upwards of 500 pounds or more, in a single step. In contrast, older methods were limited to making a succession of 10 pound batches.

Theoretically, foam processing comprises all steps intervening between addition of "TDI" to the foaming resin and dismantling the mold assembly to obtain the foamed product. The novel features of this process, however, are related to the highly effective control of condensation temperatures over the entire range of mixing from the compatibility step to the pour point made possible for the first time by metered introduction of solid carbon dioxide in a fine state of subdivision directly to the batch. The use of Dry Ice to maintain low temperatures is especially desirable since its cooling effect is instantaneous within the body of the mix; hence only small quantities need be added to effect a rapid reduction in temperature. Solid $CO_2$ is also an expandable refrigerant because the end product, $CO_2$ gas, is vented to the atmosphere from the foam condensate after it has exerted its refrigeration effect of 138.7 cal./gm. or 250 B.t.u./lb. is undergoing this change in state. The intense cooling effect due to the large temperature gradient of the order of 180° F. between the melting point of solid $CO_2$, −109.4° F. and the average foam batter temperature of 70° F. is also a factor in controlling the temperature of large batches of foam resin-"TDI" condensate which might easily get out of control if instrumentation is not provided for synchronizing the rate of addition of solid or liquid $CO_2$ to the batch with the desired temperature.

Carbon dioxide refrigerant is available commercially as "Dry Ice" fifty pound blocks and as finely divided snow obtained by discharging "low pressure" $CO_2$ liquid from an orifice. Both forms contain less than 0.1 percent water, which is insufficient to cause a noticeable reduction in foam properties due to the small quantity of linear polyureas formed by "TDI" hydrolysis reactions. Both types are, therefore, well adapted to use as an internal coolant in attaining the range of low temperatures found desirable in foaming resins of widely different "TDI" reactivity.

Solid carbon dioxide used in greater quantity could easily reduce the temperature of exothermic foam resin condensates considerably lower than the 40° F. maximum found practicable with this invention. The only limitation in this respect is the availability of a mixer of sufficient power and efficiency to conform to the temperature control schedules found optimum in this invention to produce the maximum number of both relatively low viscosity-increasing secondary urethane linkages at the termination of the stabilized viscosity range, or viscosity plateau, and the much higher viscosities secured in approaching the upper limit, or peak viscosity, at which point the reaction is allowed to proceed on its own exotherm.

Due to its unusually favorable refrigeration characteristics, carbon dioxide coolant is adapted to mixing large batches of relatively small surface/volume ratio, as contrasted to present methods employing ice water or brine external coolant. In the event carbon dioxide with less than 0.1 percent water is not available, external cooling methods can be employed to achieve an approximation to the degree of temperature control obtained by the use of carbon dioxide as an internal coolant. This, however, is a costly and inefficient method of controlling foam condensate temperatures because of the large amount of coolant required and the difficulty of securing adequate scraping action of the mixer blades on the walls of the container to remove the thick, solidified coating of condensate which does not enter the reaction zone. Direct addition of coolant to the batch permits full utilization of the heat absorbed by its sublimation, and has the further advantage of providing a dry, fireproof blanket of heavy $CO_2$ gas over the condensate, effectively insulating the viscous product from surrounding air of varying moisture content.

Expendable carbon dioxide refrigerant is available as a "normal" temperature liquid in high pressure tanks having a gauge pressure of 839 pounds per square inch at 70° F. or as a "cold" low pressure liquid commercially supplied by a convertor maintained at 300 pounds gauge pressure at +1 degrees F. It is also supplied in the form of 50 pound solid carbon dioxide blocks, the "Dry-Ice" of commerce. This invention may be carried out successfully with the finely divided carbon dioxide snow obtained from the liquid product stored in high and comparatively low pressure tanks, and also the powder obtained by mechanically pulverizing coarse chunks of the block material. In the initial small scale experiments with foam condensate mixed in the Brabender Plastograph limited to one pound batches of material, carbon dioxide snow was obtained from a high pressure ambient temperature tank inclined downward from horizontal and fitted with a fire extinguisher wide mouth nozzle. A fairly large canvas bag is tied over the nozzle and the liquid released quite rapidly. The resulting deposit of $CO_2$ snow collecting on the inner walls of the bag is transferred rapidly to a wide mouth Dewar vessel provided with a vented, tight fitting stopper to provide a sufficient back pressure to prevent ingress of ambient air which always carries varying amounts of moisture.

High pressure tank sources of solid carbon dioxide obviously are not economical since the maximum amount of snow obtained by this method is about 9 pounds. Solid carbon dioxide blocks costing only 4 cents a pound comprise the cheapest commercial source of this refrigerant, and render the process attractive from a commercial viewpoint. Further, the method of manufacturing blocks guarantees a maximum water content of 0.05 percent. If Dry-Ice blocks are used, however, considerable care must be taken in removing the condensed water-ice layer from each of the six sides before pulverizing. This may be done by wiping the block vigorously with a dry cloth if the layer is thin, but if it is thick slabs one-half inch thick must be removed from each of the sides with a band saw before reducing the material to a powder. However, care must be taken, in pulverizing operations, to work quickly and protect the material as much as possible from exposure to moist ambient air. In laboratory work, the required amount of solid $CO_2$ should be broken from the block with a cold chisel and placed immediately in a canvas bag for further reduction with a mallet. The smaller chunks are then put in a Waring Blendor fitted with a cover for quick reduction to powder. The powder is subsequently stored in a beaker or vacuum flask, and put in a vented dessicator. This technique usually does not increase the moisture content more than 0.02 percent above the initial value. Alternately, when the process is carried out on a commercial scale, requiring a minimum of 50 pounds of carbon dioxide powder for one or more 500 pound batches of condensate, a commercial motor driven $CO_2$ pulverizer is recommended. These machines produce 500 pounds, or more, of powder per hour. The powder thus made should be stored in shallow trays in commercial Dry Ice chambers to avoid agglomeration.

In further consideration of the relative merits of the snow and powder forms of $CO_2$ as internal coolants for alkyd-"TDI" condensates, it is well to point out that the fog-like dispersion of snow created by a jet of expanding "low pressure" $CO_2$ liquid as furnished by a convertor at +1 degrees F. with 300 pounds pressure in a highly desirable source. The basic equipment consists of a shut-off valve, a nozzle, and the necessary pipe and fittings to the convertor source of $CO_2$ liquid. Although the refrigeration of $-109°$ F. snow obtained by this method is only 114 B.t.u./lb. $CO_2$ in respect to the amount furnished, the labor and precautions required to prevent moisture absorption in pulverizing operations are avoided. Furthermore, the snow is in a much more finely divided form than the powder and can be accurately metered into the reaction mixture to provide more uniform temperature control during the progress of condensation reactions at any prescribed temperature.

The $CO_2$ internal coolant process facilitates the attainment of favorable manufacturing characteristics and foam product properties heretofore considered impracticable because of inherent difficulties in improving the efficiency of polyisocyanate cross linking reactions. This is due to the overwhelming prevalence of polyurethane reactions over the polycarbonamide types due to the great excess of hydroxyl over carboxyl groups in the resin as well as their greater reactivity. Although older methods of no temperature control, and limited constant temperature control in the 80–85° F. range are successful in producing foams with a modicum of structural properties, the rapid increase in viscosity obtained by these methods traps a large number of unreacted hydroxyl, as well as hydroxyl groups in the foamed polymer. This difficulty is remedied to a considerable extent by the internal cooling method of conducting the condensation, but the drawbacks inherent in the principle of making foamed-in-place products by the principle of first building up a sufficient viscosity in the mix by non-expanding polyurethane reactions to trap gas evolved in the creation of polyamide linkages cannot be eradicated entirely. The outstanding feature of the low temperature processing method is that it has succeeded greatly in minimizing these difficulties by providing a range of temperatures in the mix sufficiently low to postpone the formation of primary urethane linkages to a later stage of cure, after expansion and gelation.

It is manifestly difficult to give direct proof of the existence of secondary or labile urethane linkages in the early stages of processing, prior to the relaxation of temperature control and the release of exothermic heat. However, the presumption of the existence of these groups is strong in view of the early stabilization of the viscosity of the condensate over a considerable range of time. The pronounced increase of mobility of the condensate, due to the decrease in reaction velocity secured by low temperatures made possible for the first time by the use of $CO_2$ internal coolant, is undoubtedly the main factor in providing favorable conditions for more complete cross linking. While a substantial amount of the potential exothermic heat of the system is evolved in the creation of intermediate, non-expanding, linkages at low temperatures, as indicated by the progressively increasing viscosities at these temperatures, the bulk of this heat is evidently conserved. This conclusion is reached by a study of Examples 19–24, inclusive, processing data, given in Table 4. Condensates reacted to high viscosities at 40–50° F. are able to develop approximately the same maximum temperature and minimum viscosity on release of exotherm. Somewhat higher expansion temperatures are also obtained. This indicates a more effective conservation of exothermic heat than obtained with condensates processed in the 60–70° F. range.

The value of only a moderate temperature reduction to 70° F. was demonstrated in early exploratory studies of the low temperature process carried out with the Brabender Plastograph. This device gives a continuous record of viscosity as a function of time. This is done by employing a freely swinging dynamometer to convey the torqued mixing to a lever system which records viscosities as metergrams on a chart traversing an inked stylus as a constant rate. A calibration curve is constructed for converting metergrams to poises from data furnished by resins of a wide range in viscosity, and also by interrupting the mixing of a slow reacting resin and making direct measurements with a Brookfield viscosimeter.

The Plastograph, unfortunately, is limited in recording viscosities much above 10,000 poises due to insufficient driving force of its ⅛ H.P. motor, and hence, cannot be used to obtain the full processing cycle of batches cooled to 60° F. The mixing chamber provided with this device is also incapable of mixing more than about 525 grams of condensate. This device, and also the Hobart laboratory size mixer capable of mixing 5 to 10 pound batches, are basically unsuitable for investigating processing cycles in the 60 to 40° F. range. They are, therefore, eliminated in favor of a much stronger 1 H.P. Hobart planetary mixer geared for slow, medium, and fast mixing speeds and provided with a five gallon mixing bowl for mixing 35 to 50 pound batches. The mixing efficiency of the Hobart machine is increased greatly by modifying the standard blade. Holes are drilled and tapped along the leading edges of the standard "B" beater blade to which a "Kel-F" or "Teflon" fluorocarbon sheet is attached. This sheet is fitted to the contour of the mixing bowl, thereby giving a scraping action which removes all material adhering to the sides. Brookfield viscosimeters in two viscosity ranges, from 1 to 320,000 poises, and appropriate spindles with 8 or 12 in. extensions are used as required to measure the viscosity of batches processed over the wide viscosity range of this invention. Temperature measurements are made with a copper constantan thermocouple soldered into the center base of the bowl through a plastic block retainer, and connected either to a potentiometer or a Leeds and Northrup Micromax temperature recorder.

The prolongation of mobility by use of $CO_2$ coolant to obtain lower temperatures than provided by other methods permits the foaming of more reactive, sterically unhindered resins such as those described in my aforementioned patent application, and herein appearing in Tables 1 and 2 as Examples 6-18. These resins, because of their more exposed functional groups, react much more rapidly than Selectron 5922 at 80-85° F. temperatures obtained by older methods using ice water as an outside coolant. They actually give foams of lower density than Selectron 5922 since they are inherently capable of greater expansion. Table 5 data on the density of unrestricted foams made with representative resins of this group made by Examples 19, 22 and Y processes, respectively (Table 4) show the advantage of low temperatures in attaining peak viscosity prior to discontinuing the addition of coolant.

TABLE 5
EFFECT OF PROCESSING TEMPERATURE ON THE DENSITY OF UNRESTRICTED FOAMS

| Example number (process) | Temp. to peak viscosity, °F. | Density of unrestricted foams, lb./c. ft. | | |
|---|---|---|---|---|
| | | Selectron 5922 | Example 12 resin | Example 16 resin |
| Y | 85 | 9.3 | 12.0 | 14.3 |
| 19 | 70 | 8.1 | 7.2 | 6.0 |
| 22 | 60 | 7.0 | 4.8 | 3.7 |

The term "unrestricted" refers to foams allowed to expand in an open cavity with no restraint, as contrasted to "restricted" foams made to the desired density by introducing the calculated weight of batter into a cavity of known volume. Obviously, a batter added in insufficient quantity to expand fully into a closed mold produces an unrestricted foam. It is desirable, therefore, in assessing the foaming capabilities of different alkyd-"TDI" condensates, to conduct tests under conditions of no restriction before making foamed samples of an arbitrary density for test purposes. Restricted foams of the same density, within reasonable limits, are always made in comparing product properties of the same material processed by different methods, or different materials (such as foaming resins) foamed by essentially the same process. Tables 3 and 6 product data obtained by different methods are based on restricted foams having a density of 10 lb./c. ft. plus or minus 0.2 lb./c. ft. Foams of 10 lb./c. ft. density are considered typical of the density generally used for load bearing applications, such as foamed-in-place sandwich radomes subject to aerodynamic loading.

The product property data recorded in Table 6 for Selectron 5922 illustrate the importance of processing variations in controlling the physical and mechanical strength properties of the final product. Perhaps the most striking feature of the processing data given by Examples 19-24, Table 4, which affects manufacturing is the increased trend in induction time with reduced peak viscosity temperatures. "Induction times" are the elapsed times from the pour point to the start of expansion in the mold. Long induction times are considered advantageous since they give ample time for the placement of the male mold and associated tooling in the matched die molding of foamed parts. Induction times, therefore, are in effect equal to the working times.

Examples 19-24, Table 4, processing schedules for Selectron 5922-"TDI" condensates are typical because of their applicability to all classes of foaming alkyds with the exception of those made with ethanolamines and polycarboxylic acids of such high functionality that they gel before the compatibility stage is reached. The essential processing factors of Table 4 are: temperature and viscosity readings at the compatibility end point, stabilized viscosity range, first peak viscosity, pour point (solvent free), second peak viscosity, and pour point (solvent added). Temperature and viscosity determine the degree of cross linking rather than mixing times. Mixing times, in turn, are proportional to mixing efficiency; the more effective and thorough the mixing, the shorter the times required to attain the temperatures and viscosities recorded in Table 4 for Selectron 5922.

It is well to point out that the processing data given for Selectron 5922 in Table 4 are not absolute and the same for all resins of widely different reactivity. The only variables that are under direct control and are invariant with respect to resin are the temperatures chosen for attaining the compatibility end point, stabilized viscosity or viscosity "plateau" range, and first and second peak viscosities. The viscosities reached at each of these levels are predetermined by the nature of the resin and the amount of "TDI" used. The temperatures and viscosities reached at the viscosity minimum and the solvent-containing and solvent-free pour points depend on intensity of exotherm developed in the system on relaxation of temperature control by discontinuing the addition of $CO_2$ coolant, and are thus beyond control of the operator unless he desires to modify them by the addition of coolant.

The seven separate stages of alkyd-"TDI" processing are obtained as follows:

(1) *Compatibility end point.*—Prior to starting the mixing, the inner walls of the container are thoroughly wet down with liquid "TDI." This prevents undue sticking of the resin which is now weighed into the vessel. The mixer is started on slow speed, and finely divided solid $CO_2$ added gradually over a period of 2-3 minutes until the resin is pre-cooled to about 72° F. The calculated amount of "TDI" required for the condensation is added over a period of about 6-8 minutes, the mixer still operating on slow speed, taking care to add the liquid in small portions or as a slow steady stream to avoid splashing. Appreciable exotherm is evolved even at this early stage of mixing, so that solid $CO_2$ must be added at a sufficient rate to prevent the temperature from exceeding about 73° F. It is even more important that the temperature be not permitted to decrease within or below the crystallization range of commercial "TDI." If this condition prevails, the reaction mixture requires stirring for considerably longer times before compatibility occurs. Gradually, as the mixing is continued within the range of about 71-73° F., it assumes a shiny translucent appearance, indicating a close approach to the end point of compatibility also designated by the gradual merging of the mixture into a homogeneous one phase system. Inspection of thin smears of the material on a spatula aid in recognizing this end point.

(2) *Stabilized viscosity range.*—After achieving compatibility at the lowest temperature needed to secure a preliminary reaction of "TDI," the next step is to continue mixing at the compatibility temperature at the same, or lower temperatures, usually in the 70–40° F. range, until the condensate shows a marked increase in viscosity after usually quite prolonged periods of mixing in a region of comparatively constant viscosity. In the continued maintenance of constant temperatures of 70, 60, 50, or 40° F. after compatibility is attained, it is necessary to add solid $CO_2$ at regular intervals to absorb the cross linking reaction exotherm. Considerably larger quantities are required at 40–50° F. than at 70° F., probably as a result of the more marked ambient temperature gradient. The existence of regions of fairly constant viscosity lend credence to the theory that low viscosity-increasing labile or secondary valence bonds are formed over a considerable period of time. The horizontal character of the viscosity plateau is more pronounced at 70° F. extended compatibility processes; at lower temperatures, the average values quoted are correct only within plus or minus 2 percent for 60° F. processes; 4 percent for 50° F. processes; and 8 percent for 40° F. processes. In this extended compatibility phase of mixing the reactants, the mixer is operated on No. 2 medium speed which is increased to No. 3 speed for Examples 19–21 seventy degree processes.

(3) *First peak viscosity.*—Due to the comparatively high reactivity of constant temperature processed condensates at 70–40° F., the viscosity ultimately will increase to gelation unless the addition of solid $CO_2$ is stopped before the system loses so much exotherm by prolonged mixing that it is incapable of generating the amount of heat required to attain a sufficiently low pour point after adding 2 percent solvent on the weight of the batch. Obviously, in condensations of this type it is necessary to determine the critical peak viscosities by empirical methods. Peak viscosities are far from constant, and will vary tremendously with different resins. Examples 21–24 peak viscosities for Selectorn 5922 resin are so adjusted that cessation of cooling is effective in attaining about the same viscosity minimum for all four processes. A low viscosity is needed at pour to minimize air entrapment which causes blow holes of varying size throughout the foam.

(4) *Viscosity minimum.*—This occurs at various times from 5 to 15 minutes after cessation of cooling at peak viscosity. If mixing is continued at the temperature characteristic of the viscosity minimum without adding solvent, both the viscosity and temperature will continue to increase. The occurrence of viscosity minima is undoubtedly due to the temporary action of the heat of reaction in reducing the viscosity of the condensate at a more rapid rate until it accelerates polymerization.

(5) *Pour point, solvent-free.*—This is a preferred pour point since it is seldom necessary to add solvent to batters in the 400–500 ps. viscosity range to secure foamed products of good texture without objectionable air entrapment. Minimum occlusion of solvent in the cured foam is highly desirable. Besides weakening the foam, occluded solvent reduces the firmness of the adhesive bond to the boundary surface due to its action in introducing a plane of cleavage at the face. However, Table 4 Part B, shows that Examples 21–24 processes require only 2 percent solvent to secure a suitably low pour point with correspondingly less solvent retention; compare Table 6.

TABLE 6

PRODUCT PROPERTIES OF RESTRICTED 10 LB./C. FT. FOAMS MADE WITH SELECTRON 5922 FOAMING RESINS BY EXAMPLES 19-24 METHODS OF CONTROLLING TEMPERATURE BY THE LOW TEMPERATURE CONDENSATION PROCESS

| Example number [1] (process) | Texture [2] | Color [2] | Water absorption, percent | Mechanical strength properties in pounds per square inch | | | | | Acetone retention,[3] percent |
|---|---|---|---|---|---|---|---|---|---|
| | | | | Compression | | Shear two plate | Tensile | Toughness | |
| | | | | 75° F. | 200° F. | | | | |
| 19 | M | PY | 2.1 | 300 | 240 | 198 | 210 | 3.8 | 0 |
| 20 | F | O | 2.6 | 322 | 193 | 202 | 210 | 3.6 | 1.5 |
| 21 | F | O | 2.4 | 320 | 190 | 210 | 220 | 3.6 | 0.8 |
| 22 | F | O | 2.3 | 330 | 200 | 215 | 234 | 4.0 | 0.6 |
| 23 | F | O | 2.3 | 328 | 215 | 214 | 233 | 3.8 | 0.4 |
| 24 | M | O | 2.2 | 331 | 225 | 215 | 235 | 3.8 | 0.3 |
| X | M | Y | 5.8 | 220 | 132 | 130 | 145 | 1.4 | 0 |
| Y | F | PY | 3.4 | 260 | 156 | 160 | 181 | 2.5 | 2.0 |

[1] Examples X and Y are respective prior art methods which use no temperature control and complete temperature control at 80–85° F. to pour point by external cooling, respectively, cf. Table 4.
[2] Texture and color designations are same as in Table 3.
[3] Acetone retention, percent, or solvent retention of other solvents, is the quantity of solvent occluded in the foam after cure, and is determined by measuring the loss in weight on heating thin sections. Initially, 4 percent acetone is added on the weight of condensate made by Processes 20–24, inclusive, and reference process Y.

Fortunately, several of Examples 1–18 resins develop sufficient exotherm in Examples 21 and 22 processes to insure pour points of about 400 poises without adding solvent. This is only one instance where the more reactive, less sterically hindered resins, develop better product properties by virtue of their better processing characteristics. Example 19 process for Selectron 5922 is carried beyond the viscosity minimum to pour to take advantage of the extra mixing time in developing better foam properties.

(6) *Second viscosity peak.*—Example 20 illustrates the versatility of the process in providing conditions for additional mixing time by regenerating a high viscosity by extended mixing, with limited addition of coolant, to prevent the solvent-containing pour point temperature from exceeding 86° F. This process achieves the same reaction time to pour as does Example 21 process, but has the disadvantage of requiring twice the amount of solvent to attain the same pour point of about 400 poises.

(7) *Pour point, solvent added.*—This pour point is obtained by adding only 2 percent acetone on the weight of the batch for Examples 21–24 processes, inclusive. Pour point temperatures are not appreciably higher than viscosity minimum temperatures, since the pour point reductions to minima in the range of 390–410 poises occur within 3 to 5 minutes. It is noted that the pour times, or total reaction times from the start of mixing, increase markedly as the temperature control in mixing to the peak viscosity is reduced from 70 to 40° F.

The data on expansion criteria show the advantages of longer mixing times at lower temperatures in conserving the potential exothermic heat of the system to such a degree that expansion and gelation temperatures are increased appreciably. These conditions favor more complete decarboxylation of the condensates before the expanded foam is immobilized by gelation, and the unstable anhydride linkages either become trapped in the foam or tend to decompose with $CO_2$ evolution shortly after gelation occurs. This causes appreciable cell stretching in the direction of foaming, and considerably reduced strength properties of foam samples tested with load applied perpendicular to the direction of foaming. In contrast, foams made by X and Y methods, both prior art methods respectively utilizing no temperature control and complete temperature control to pour point at 85° F. by external cooling, provide characteristically lower expanding and gelation temperatures and viscosities, phenomena that are clearly responsible for the inferior product properties of foams made by these processes as recorded by Table 6.

The long induction times of 8 to 14 minutes obtained with Examples 19–24 processes make possible a variation of the process of considerable value from a practical point of view. This variation is included within the scope of my invention, and comprises the conversion of Examples 19–24 process condensates reacted to the first solvent-free or second solvent-containing pour points to the solid form for storage at low temperatures for an indefinite time. The pre-processed batter then can be shipped in the frozen state to remote locations, and reactivated for expansion merely by removing the refrigerant and allowing it to regain its original pour point temperatures for delivery to the molds or cavities to be foamed. This feature is especially valuable for the consumers of foamed products, since it is no longer necessary for the user to set up costly processing facilities to duplicate the precise temperature controls necessary in achieving the optimum cross linking capabilities of improved foaming resins that cannot be successfully foamed by other processes.

Briefly, the steps for making solid pre-processed foam condensate are as follows:

(1) Pour condensates suitably mixed to pour point temperatures and viscosities not exceeding 88° F. and 450 poises, respectively, into a shallow container pre-cooled to temperatures of about —90 to —109.4° F. with solid $CO_2$. The container is first lined with polyethylene, polyethylene glycol terephthalate ("Dacron"), or other film material of adequate strength at low temperatures, and filled to a depth of about ½ inch with $CO_2$ snow or powder.

(2) Pour foam condensate directly over the bed of solid $CO_2$ to the maximum depth that can be quickly frozen and cooled to a temperature of about —30° F., or less. Immediately cover the freshly poured condensate with more $CO_2$ powder or snow in sufficient depth to insure rapid freezing. Tests of the rate of cooling are made with a thermocouple inserted into the batter immediately after pouring.

(3) Repeat step 2, pouring a second quantity of condensate approximately equal in amount to that delivered to the container in the first pouring. Cover the second portion of poured condensate with another layer of solid $CO_2$ to obtain an equally rapid rate in reduction in temperature of condensate accompanied by rapid solidification.

(4) Continue a succession of alternate pouring and solid $CO_2$ stratification steps as outlined by steps 2 and 3 until the entire batch of condensate has been poured. Cover the last quantity of material poured with a 1-inch layer of solid $CO_2$ and store the stratified foam briquette in a suitably insulated $CO_2$ storage cabinet.

Steps 1–4, inclusive, must be accomplished rapidly, well within the induction times of the particular process used in preparing condensates, Examples 19–24. Usually, it is possible with rapid manipulation to accomplish all foam batter transfer operations and solid $CO_2$ stratifications within 5 minutes. The low pressure $CO_2$ liquid source as described above for controlled delivery of $CO_2$ snow is especially advantageous in expediting rapid freezing of successive pourings of condensate.

Foams processed in accordance with Examples 19–24 processes are cured by the usual method of pouring into ambient temperature molds, or molds preheated to temperatures of 130–150° F. After pouring, the mold is closed and placed immediately into an oven maintained at 150–160° F., at which temperature the condensate is in a foamable state giving off $CO_2$ gas. One half hour after placing the mold in the oven, the temperature is raised to 275° F. during a ½ hour period. Thereafter, the entire assembly is cured at 275° F. for 2 to 4 hours after fully accompylishing expansion and gelation steps at 150–160° F. Alternately, strip heaters and thermistors are substituted for the oven if the assembly is too large or cumbersome for placement in available ovens. Infrared heating facilities are also satisfactory in meeting the above curing schedule for some tooling assemblies.

The above curing schedules are also applicable to frozen briquettes of foam condensate. It is necessary, however, to first break the material into small pieces while still frozen before transfer to the mold cavity maintained at 130–150° F. to hasten melting and return to the original pour point temperatures. Alternately, the broken pieces can be liquefied in an outside container and poured into the mold after they regain the original pour point temperatures. The frozen condensate is very friable, and the reduction to small fragments is readily accomplished. The physical properties of cured Selectron 5922 foams made by liquefying briquettes are identical with those found for condensates poured immediately into cavities to be foamed, Table 6.

In summary, my low temperature process is probably equally important with improved foaming resins in making foamed-in-place plastics products of superior characteristics. The product data for Selectron 5922 processed foams, Table 6, confirm the advantage of long time mixing and attendant prolonged mobility of the condensate in achieving better properties. Long time mixing also is advantageous in reducing the retention of acetone or other solvents, such as methylene chloride or ethyl chloride optionally used to obtain low pour points. This is reflected in the improved resistance to heat distortion, gradually approaching with reduced mixing temperatures the optimum compression strength at 200° F. obtained by the solvent-free process, Example 19.

Mechanical strength tests of foam samples are carried out in conformance with MIL–STD–401 specification of July 3, 1952, entitled "Sandwich Construction and Core Materials; General Test Methods." Particular care is taken in applying loads in the same direction relative to the direction of foaming in order to secure comparative results. Direction of loading is perpendicular to the direction of foaming in all tests herein reported. Water absorption is determined by measuring the weight gains of foam specimens subjected to 24 hours' exposure in a closed container containing water and maintained at 160° F.

Finally, chemical analysis of shredded foam samples confirms the superiority of Examples 19–24 processes over the older Example Y constant temperature method. Analytical methods throw light on the percentages of uncombined resin and semi-quantitative data on the relative amounts of uncombined terminal isocyanate groups and free carboxyl groups that fail to enter into cross linking reactions. For example, a 48 hour reflux of 25 gram samples of powdered Selectron 5922 foam obtained from Example 21 process gives a 4% yield of soluble resin as contrasted to a 7.5% yield from Example Y method formerly used. In respect to the content of unreacted NCO groups attached to the foamed macropolymer, prolonged boiling of 5.0 gram samples of shredded foams with distilled water in a closed system provided with liquid potassium hydoxide absorbent gives rise to the evolution of 0.01 gram of $CO_2$ gas with Example 21 foam as compared to 0.02 gram obtained with Example Y material.

Lastly, acid number determinations of butyl acetate used in attempts to dissolved pulverized foams reveal the superiority of Example 21 processed material. The acid numbers of Examples 21 and Y processed foams are 2.8 and 5.1, respectively, indicating a higher percentage of carboxyl group cross linking for low temperature processed material. The development of finite acidity in this butyl acetate reflux test is due to trans-esterification reaction $$RCOOH + BuOAc \rightarrow RCOOBu + HAc$$

where R represents the partially cross linked resin molecule.

The analytical results for uncombined COOH and NCO groups in the above tests are undoubtedly too low, since they represent chemical reactions obtained on the outside surface only of the foam particles. Thus the carbon dioxide evolved by boiling pulverized foams with water originates from the hydrolysis of exposed NCO groups on the surface of the particles.

Obviously, many modifications and variations of the present invention are possible in the light of the above teachings. It is, therefore, to be understood that within the scope of the appended claims the invention may be practiced otherwise than as specifically described.

What is claimed is:

1. The process of making foam structures which comprises reacting an alkyd resin which is the reaction product of a dicarboxylic acid and an alcohol containing only carbon, hydrogen, and oxygen atoms selected from the group consisting of dihydric and trihydric alcohols, said alkyd resin having an acid number in a range between approximately 26 to 110 and a hydroxyl number in the range between approximately 228 to 505, with an organic polyisocyanate selected from the group consisting of a 2,4-toluene diisocyanate, a 2,6-toluene diisocyanate, and a 1,6-hexamethylene diisocyanate in a proportion of from approximately 59 to approximately 92 parts by weight of the organic polyisocyanate to 100 parts of the resin, mixing pulverized solid carbon dioxide into the polyisocyanate-resin liquid condensate in sufficient amount to maintain said condensate at substantially constant temperature in a range between about 70° to 73° F. to conserve exothermic heat of reaction while continually stirring until homogeneous single phase compatibility is obtained, further mixing into the condensate additional pulverized solid carbon dioxide in amount sufficient to maintain said condensate at a relatively constant preselected temperature in a range between about 40° to 70° F. after attaining single phase compatibility while continuing mixing at comparatively constant viscosity until an abrupt increase in viscosity occurs, allowing the condensate to proceed uninhibited on its own exotherm while continuing mixing until a minimum pour point viscosity is reached for pouring into molds, and maintaining said condensate at a foamable temperature after pouring into molds until the evolution of gas is completed and the foam structure is set.

2. The process of making foam structures which comprises reacting an alkyd resin which is the reaction product of a dicarboxylic acid and an alcohol containing only carbon, hydrogen, and oxygen atoms selected from the group consisting of dihydric and trihydric alcohols, said alkyd resin having an acid number in the range between approximately 26 to 110 and a hydroxyl number in the range between approximately 228 to 505, with an organic polyisocyanate mixture consisting of an isomer blend of 2,4-toluene diisocyanate and a 2,6-toluene diisocyanate in the proportion of approximately 59 to approximately 92 parts by weight of the organic polyisocyanate mixture to 100 parts of resin, mixing pulverized solid carbon dioxide into the polyisocyanate-resin liquid condensate in sufficient amount to maintain said condensate at substantially constant temperature in a range above the crystallization range of the organic polyisocyanate mixture and below about 73° F. to conserve exothermic heat of reaction while continually stirring until homogeneous single phase compatibility is obtained, further mixing into the condensate additional pulverized solid carbon dioxide in amount sufficient to maintain a relatively constant preselected temperature in a range between about 40° to 70° F. after attaining single phase compatibility while continuing mixing at comparatively constant viscosity until an abrupt increase in viscosity appears, allowing the mixture to proceed uninhibited on its own exotherm while continuing mixing until a minimum pour point viscosity is reached for pouring into molds, and maintaining said condensate at a formable temperature after pouring into molds until the evolution of gas is completed and the foam structure is set.

3. The process of making foam structures which comprises reacting an alkyd resin which is the reaction product of a dicarboxylic acid and an alcohol containing only carbon, hydrogen, and oxygen atoms selected from the group consisting of dihydric and trihydric alcohols, said alkyd resin having an acid number in a range between approximately 26 to 110 and a hydroxyl number in the range between approximately 228 to 505, with an organic polyisocyanate mixture consisting of an isomer blend of approximately 60 parts by weight of a 2,4-toluene diisocyanate with approximately 40 parts by weight of a 2,6-toluene diisocyanate in a proportion of from approximately 59 to approximately 92 parts by weight of the organic polyisocyanate mixture to 100 parts of resin, mixing pulverized solid carbon dioxide into the polyisocyanate-resin liquid condensate in sufficient amount to maintain said condensate at substantially constant temperature in a range below about 73° F. and above about 42° F. to conserve exothermic heat of reaction while continually stirring until a homogeneous single phase compatibility is obtained, further mixing pulverized solid carbon dioxide into the polyisocyanate-resin liquid condensate in sufficient amount to maintain said condensate at a relatively constant preselected temperature in a range between 40° to 70° F. after attaining a single phase compatibility while continuing mixing at comparatively constant viscosity until an abrupt increase in viscosity occurs, allowing the mixture to proceed uninhibited on its own exotherm while continuing mixing until a minimum pour point viscosity is reached for pouring into molds, and maintaining said condensate at a foamable temperature after pouring into molds until the evolution of gas is completed and the foam structure is set.

4. The process of making foam structures which comprises reacting an alkyd resin which is the reaction product of a dicarboxylic acid and an alcohol containing only carbon, hydrogen, and oxygen atoms selected from the group consisting of dihydric and trihydric alcohols, said alkyd resin having an acid number in the range between approximately 26 to 110 and a hydroxyl number in the range between approximately 228 to 505, with an organic polyisocyanate in a proportion from approximately 59 to approximately 92 parts by weight of the organic polyisocyanate to 100 parts of the resin, mixing solid carbon dioxide into the polyisocyanate-resin liquid condensate in sufficient amount to maintain said condensate at substantially constant temperature in a range above 70° F. and below about 73° F. to conserve exothermic heat of reaction while continually mixing until homogeneous single phase compatibility is obtained, further mixing solid carbon dioxide into the polyisocyanate-resin liquid condensate in sufficient amount to maintain a relatively constant preselected temperature in a range between about 40° to 70° F. after attaining single phase compatibility while continuing mixing at comparatively constant viscosity until an abrupt increase in viscosity occurs, allowing the mixture to proceed uninhibited on its own exotherm while continuing mixing until a minimum pour point viscosity is reached for pouring into molds, and maintaining said condensate at a foamable temperature after pouring into molds, until the evolution of gas is completed and the foam structure is set.

References Cited in the file of this patent

UNITED STATES PATENTS

| | | |
|---|---|---|
| 2,577,279 | Simon et al. | Dec. 4, 1951 |
| 2,577,281 | Simon et al. | Dec. 4, 1951 |
| 2,706,311 | Durst et al. | Apr. 19, 1955 |